US011174434B2

(12) United States Patent
Muenzenberger et al.

(10) Patent No.: US 11,174,434 B2
(45) Date of Patent: Nov. 16, 2021

(54) FIREPROOFING SEALING MASS AND USE THEREOF

(71) Applicant: Hilti Aktiengesellschaft, Schaan (LI)

(72) Inventors: Herbert Muenzenberger, Wiesbaden (DE); Sebastian Simon, Buchloe Lindenberg (DE); Ingrid Woelfle, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 243 days.

(21) Appl. No.: 16/400,091

(22) Filed: May 1, 2019

(65) Prior Publication Data

US 2019/0256779 A1 Aug. 22, 2019

Related U.S. Application Data

(63) Continuation of application No. 15/304,217, filed as application No. PCT/EP2015/057945 on Apr. 13, 2015, now Pat. No. 10,323,189.

(30) Foreign Application Priority Data

Apr. 16, 2014 (EP) .................................... 14164839

(51) Int. Cl.
| | | |
|---|---|---|
| *C08K 13/04* | (2006.01) | |
| *C08K 3/38* | (2006.01) | |
| *C08K 3/34* | (2006.01) | |
| *C08K 7/14* | (2006.01) | |
| *C08K 7/28* | (2006.01) | |
| *C08K 3/32* | (2006.01) | |
| *C08K 3/22* | (2006.01) | |
| *C09K 21/04* | (2006.01) | |
| *C09K 21/12* | (2006.01) | |
| *C08K 3/26* | (2006.01) | |
| *C08K 3/04* | (2006.01) | |
| *C09K 21/02* | (2006.01) | |

(52) U.S. Cl.
CPC ................ *C09K 21/04* (2013.01); *C08K 3/04* (2013.01); *C08K 3/22* (2013.01); *C08K 3/26* (2013.01); *C08K 3/32* (2013.01); *C08K 3/34* (2013.01); *C08K 3/38* (2013.01); *C08K 7/14* (2013.01); *C08K 7/28* (2013.01); *C08K 13/04* (2013.01); *C09K 21/02* (2013.01); *C09K 21/12* (2013.01); C08K 2003/2265 (2013.01); C08K 2003/265 (2013.01); C08K 2003/323 (2013.01); C08K 2003/387 (2013.01)

(58) Field of Classification Search
CPC .......... C08K 21/04; C08K 21/12; C08K 7/14; C08K 7/28; C08K 3/26; C08K 3/04
USPC .......................................................... 524/405
See application file for complete search history.

(56) References Cited

U.S. PATENT DOCUMENTS

| | | | |
|---|---|---|---|
| 3,562,197 A | 2/1971 | Sears et al. | |
| 4,442,157 A | 4/1984 | Marx et al. | |
| 5,182,049 A * | 1/1993 | von Bonin | ........ B32B 17/10311 |
| | | | 106/18.11 |
| 5,356,568 A * | 10/1994 | Levine | .................... C09D 5/185 |
| | | | 106/18.14 |
| 6,001,285 A | 12/1999 | Wunram | |
| 2003/0121272 A1 | 7/2003 | Kim et al. | |
| 2004/0054035 A1* | 3/2004 | Hallissy | ................. C09D 5/185 |
| | | | 523/219 |
| 2004/0183051 A1 | 9/2004 | Wenzel et al. | |
| 2004/0256605 A1 | 12/2004 | Reinheimer et al. | |
| 2005/0009966 A1* | 1/2005 | Rowen | .................... C09D 5/185 |
| | | | 524/115 |
| 2009/0221203 A1* | 9/2009 | Nosker | .................. D06N 3/128 |
| | | | 442/301 |

FOREIGN PATENT DOCUMENTS

| | | |
|---|---|---|
| DE | 196 31 813 A1 | 2/1998 |
| DE | 102 59 084 A1 | 7/2003 |
| DE | 102 59 084 A1 | 7/2004 |
| EP | 0 138 546 A2 | 4/1985 |
| EP | 0 429 246 A1 | 5/1991 |
| GB | 755551 A | 8/1956 |
| PA | 1 489 136 A1 | 12/2004 |

OTHER PUBLICATIONS

International Search Report (PCT/ISA/220 & PCT/ISA/210) issued in PCT Application No. PCT/EP2015/057945 dated Jun. 15, 2015 with English translation (six pages).
German-language Written Opinion (PCT/ISA/237) issued in PCT Application No. PCT/EP2015/057945 dated Jun. 15, 2015 (five pages).

\* cited by examiner

*Primary Examiner* — Deve V Hall
(74) *Attorney, Agent, or Firm* — Grüneberg and Myers PLLC

(57) ABSTRACT

The invention relates to a composition comprising: a binding agent based on an aqueous, or solvent-based polymer dispersion; fireproofing additives comprising a physically acting expanding agent and an ash-crust stabilizer; inorganic fibers; and a spherical filler. The invention also relates to the use of said composition as a sealing mass, in particular as a fireproofing sealing mass.

20 Claims, No Drawings

FIREPROOFING SEALING MASS AND USE THEREOF

This application is a continuation of U.S. application Ser. No. 15/304,217, filed on Oct. 14, 2016, which was the National Stage entry under § 371 of International Application No. PCT/EP2015/057945, filed on Apr. 13, 2015, and which claims the benefit of EP Application No. 14164839.4, filed on Apr. 16, 2014.

The invention relates to a composition for fireproofing applications, particularly a sealing mass based on an aqueous or solvent-based polymer dispersion as well as its use to seal openings, cable and pipe ducts in walls, floors, and/or ceilings of buildings, etc.

A series of different sealing products are used, which may exist as sealing masses among other things or which are used along with other sealing products for flame- and smoke-sealing or compartmentalizing of openings, cable and pipe ducts in walls, floors and/or ceilings, of joints between ceilings and wall sections, between wall openings and structural parts to be installed, such as window- and door-frames, and between exterior walls and prehung facades of buildings for the purpose of heat insulation and/or fireproofing.

The sealing mass has its own application area for ducts of plastic-insulated single cables, cable bundles, and pipes through openings in walls, floors and/or ceilings of buildings. They are used very frequently in combination with other prefabricated systems, such as blocks or panels.

This application area pertains in particular to the sealing of openings when communication cables or pipes are already installed.

For fireproofing purposes, additives are added to the sealing masses, which at elevated temperatures, such as in a fire for example, result in the expansion (also intumescence) of the sealing mass, thus forming an insulating layer and if applicable sealing the opening created by the burning up of plastic pipes.

DE 196 31 813 A1 describes such a sealing mass, which intumesces at an elevated ambient temperature, as a result of a fire for example. The sealing mass contains a binding agent based on a combination of an acrylate dispersion and an alkyd resin, fireproofing additives, in other words those which cause intumescence, additives to stabilize the ash crust formed in the case of fire, known as ash crust stabilizers, as well as other additives and fillers.

The composition according to Example 1 of DE 196 31 813 A1 contains, besides the fireproofing additive, ammonium polyphosphate as well as zinc borate and glass fibers as ash crust stabilizers and among other things calcium carbonate as a filler, wherein the contents of zinc borate at approx. 12% by weight and ammonium polyphosphate at approx. 10% are relatively high. The described composition thus has many components, which make the composition very complex and also expensive, particularly due to the high content of zinc borate and ammonium polyphosphate.

To reduce the manufacturing costs, it is necessary to provide a simplified composition, whose fireproofing properties are not adversely influenced despite the simplified composition. To now meet the increased fireproofing requirements of various countries, a firm ash crust must be ensured that must withstand the hose-stream test common in the US, in which the ash crust must withstand, after the composition has burned up, a water jet directed at a certain pressure at the test setup. To this end, a firm ash crust is required, which can be achieved with a high content of so-called ash crust stabilizers. Taking into account the requirement that the formula is to be as simple and cost-effective as possible, this can be achieved by simplifying the composition of the ash crust stabilizers and/or reducing the content of the expensive ash crust stabilizers as well as increasing the fiber content in comparison to the composition from DE 196 31 813 A1. However, this results in the problem that by increasing the fiber content, the mass becomes tough and rough, and is accordingly difficult to work with.

Therefore, there is a need for a composition that is as simple as possible, which has good fireproofing properties, particularly which produces a firm ash crust in the event of fire, and yet that is easy to work with, and particularly to smooth.

Inventors have found out that by using a bead-shaped filler of a certain particle size, both a simple composition can be obtained and a hard ash crust is formed in the event of fire.

Surprisingly, the negative influence of the inorganic fibers on the workability can be compensated by using a spherical filler of a particular particle size, without additional additives, such as liquid components, having to be used to influence the workability. However, even for compositions having a low fiber content, the presence of the spherical filler has a positive effect on workability and results in a very hard ash crust beyond what is expected. The combination of inorganic fibers and a spherical filler of a certain particle size thus results in a synergistic effect.

It has been proven that it is sufficient when the fireproofing additives contain a physically acting propellant and an ash crust stabilizer to form a very hard ash crust in the event of fire.

A subject matter of the invention is then a composition, which comprises a binding agent based on an aqueous or solvent-based polymer dispersion, fireproofing additives, which comprise a physically acting propellant and an ash crust stabilizer, inorganic fibers, a spherical filler, and if applicable additional additives and/or fillers.

The binding agent according to the invention is a water- or solvent-based polymer dispersion, particularly an aqueous polymer dispersion. Examples of aqueous polymer dispersions that have proven themselves to a particular degree are aqueous acrylate dispersions, aqueous dispersions and emulsions respectively of urea, formaldehyde or melamine resins, polyvinyl acetates, polyvinyl alcohols, acrylate nitrile, styrene acrylates, and their copolymers.

Preferably, the composition according to the invention contains as binding agents an aqueous acrylate-(copolymer) dispersion, particularly preferred is an aqueous dispersion of a poly alkyl-(meth)acrylate and/or an alkyl(meth)acrylate copolymer. Preferably, aqueous dispersions are thereby involved that one obtains through polymerization, namely through emulsion polymerization of alkyl(meth)acrylate and/or through the copolymerization of alkyl(meth)acrylates with themselves and/or with copolymerisable comonomers, preferably such as (meth) acrylate acid, (meth) acryl amide, styrene, itaconic acid, acryl nitrile and/or citraconic acid, wherein the alkyl group of the alkyl(meth)acrylate preferably have 1 to 6 C atoms, and more preferably 1 to 4 C atoms. Particularly preferred according to the invention are aqueous dispersions of polybutyl acrylate, polyethyl hexylacrylate or alkyl(meth)acrylate-styrene copolymers. The acrylate-(copolymer) dispersion may contain homopolymers as well as copolymers or also mixtures of homopolymers and/or copolymers, and is preferably mixed with a pH value ranging from 7 to 9, preferably a pH value of 8, which is adjusted if required with a diluted sodium hydroxide solution or an ammonia solution, with the other ingredients. This aqueous acrylate-(copolymer) dispersion preferably has a solids content of 30 to 70% by weight, more preferably 45 to 65% by weight. The acrylate-(copolymer) dispersions used according to the invention are known to a person skilled in the art and are commercially available. Hardening occurs physically by drying.

According to the invention, the insulating layer, the ash crust, is formed by a physically acting propellant, which causes physical intumescence. Accordingly, the fireproofing additive comprises at least one thermally expandable compound, such as a graphite intercalation compound, also known as expandable graphite, a sheet silicate intercalation compound, particularly those with an elevated expansion volume, which are also known as expandable sheet silicates, or vermiculite.

Graphite intercalation compounds (expandable graphite) pertain for example to known embedding compounds of SOx, NOx, halogen, acetic acid and/or strong acids in graphite. These are also referred to as graphite salts. Preferred are expandable graphites, which emit $SO_2$, $SO_3$, NO and/or $NO_2$ at temperatures of 120 to 350° C. for example when they expand. Expandable graphite may be in the form of platelets for example with a maximum diameter ranging from 0.1 to 5 mm.

Preferably, this diameter lies in the range from 0.5 to 3 mm. Expandable graphites suitable for the present invention are commercially available. Generally, the expandable graphite particles are evenly distributed in the fireproofing elements according to the invention. The concentration of expandable graphite particles may also be varied in a selective, pattern-like, laminar, and/or sandwich-like manner. In this regard, reference is made to EP 1489136 A1, whose content is hereby included in this application.

Coming into consideration as sheet silicate intercalation compounds (expandable sheet silicates) are for example those compounds that are obtained by embedding intercalation compounds in native, expandable sheet silicates, particularly native vermiculite. As intercalation compounds, representatives of lithium and potassium alcoholates and lithium, sodium, and potassium salts with organic acids are preferred, which are embedded in the native sheet silicate through a cation exchange. In this regard, reference is made to DE 10259084 A1 and DE 10259085 A1 as well as the literature mentioned therein. e.g., EP 0 429 246 A1, whose contents are hereby included in this application.

In addition, vermiculite, a sheet silicate, which is inherently expandable, may be used as a physically acting propellant. The activation temperature may be modified by a cation exchange.

The physically acting propellant is contained preferably in a quantity of approx. 4 to 15% by weight, preferably [sic] 5 to 10% by weight, [and] particularly preferred 5 to 8% by weight in relation to the total weight of the composition.

Since the ash crust formed by the physically acting propellant in the case of fire and by burning up the binding agent is generally too unstable and can already be dispersed by air currents depending on its density and structure, which has a negative effect on the insulating effect of the coating, at least one ash crust stabilizer is added to the components listed above.

An "ash crust stabilizer" (frequently also referred to as a skeleton former) is a so-called skeleton-forming compound that stabilizes the carbon skeleton (ash crust), which is formed form the physically acting propellant and the binding agent. The primary principle of operation is thereby that the actually very soft carbon layers formed are mechanically solidified by inorganic compounds. Adding such an ash crust stabilizer contributes to an essential stabilization of the expanded ash crust (intumescence crust) in the case of fire, since these additives increase the mechanical stability of the intumescent layer and/or prevent their dripping off, wherein the insulating effect of the foam is maintained or reinforced.

Considered as ash crust stabilizers or skeleton formers are the compounds conventionally used in fireproofing formulas and known to persons skilled in the art, for example particulate metals, such as aluminum, magnesium, iron, and zinc. The particulate metal may be in the form of a powder, platelets, scales, fibers, threads and/or whiskers, wherein the particulate metal in the form of powder, platelets, or scales has a particle size of ≤50 μm, preferably 0.5 to 10 μm. If using particulate metal in the form of fibers, threads and/or whiskers, a thickness of 0.5 to 10 μm and a length of 10 to 50 μm are preferred. Alternatively, or additionally, one can use as an ash crust stabilizer an oxide or a compound of a metal comprised of the aluminum, magnesium, iron, or zinc group, particularly iron oxide, preferably iron trioxide, titanium dioxide and/or a borate, such as zinc borate. Examples of such additives are also found in U.S. Pat. Nos. 4,442,157 A, 3,562,197 A, GB 755 551 A as well as EP 138 546 A1.

Preferably, the ash crust stabilizer is a phosphorus-containing compound, which is selected from among salts and derivatives of the phosphorus' oxoacids. The oxoacids of phosphorus are used, since their range is very broad. Among the oxoacids of phosphorus are phosphoric acid ($H_3PO_4$) (also referred to as orthophosphoric acid), diphosophoric acid ($H_4P_2O_7$) (also referred to as pyrophosphoric acid), triphosphoric acid ($H_5P_3O_{10}$), polyphosphoric acid ($H_{n+2}P_nO_{3n+1}$), poly-meta phosphoric acid (($HPO_3)_n$), hypophosphoric acid ($H_4P_2O_6$) (also referred to as diphosphoric (IV) acid), diphosphoric (III,V) acid ($H_4P_2O_6$), phosphonic acid ($H_3PO_2(2)$, wherein the number in parentheses refers to the maximum baseness of the acid, if this differs from the total number of H atoms in the formula) (also referred to as phosphorous acid), diphosphonic acid ($H_4P_2O_5(2)$ wherein the number in parentheses refers to the maximum baseness of the acid, if this differs from the total number of H atoms in the formula) (also referred to as diphosphorous acid), phosphinic acid ($H_3PO_2(1)$, wherein the number in parentheses refers to the maximum basicity of the acid, if this differs from the total number of H atoms in the formula.

As phosphoric acid compounds, one can mention for example: monoammonium phosphate, diammonium phosphate, ammonium phosphate, ammonium polyphosphate, melamine phosphate, melamine polyphosphates, melamine resin phosphates, potassium phosphate, polyol phosphates, such as pentaerythrite phosphate, glycerine phosphate, sorbitol phosphate, mannitol phosphate, dulcitol phosphate, neopentylglycol phosphate, ethylene glycol phosphate, dipentaerythritol phosphate and similar for example. Preferably, a polyphosphate or an ammonium polyphosphate is used as a phosphoric acid compound. Melamine resin phosphates refer to compounds such as reaction products from Lamelite c (melamine-formaldehyde resin) with phosphoric acid.

The ash crust stabilizer is contained preferably in a quantity of approx. 5 to 15% by weight, preferably 6 to 12% by weight, particularly preferred 8 to 10% by weight, in relation to the total weight of the compound.

According to the invention, the compound contains inorganic fibers, particularly short-chopped fibers. These inorganic fibers stabilize the formed ash crust in the case of fire. Suitable fibers are glass fibers, particularly of e-glass, silicate fibers, or mineral wool fibers. The fibers preferably have a length of 2 to 12 mm, more preferably 4 to 8 mm, and particularly preferably 6 mm. For example, as a glass fiber, one can mention short-chopped fiber FG 413/6 made by STW (SCHWARZWÄLDER TEXTIL-WERKE, Heinrich Kautzmann GmbH) with a fiber diameter of approx. 10 µm.

The inorganic fibers are contained in a quantity of approx. 0.5 to 4% by weight, preferably 1 to 3% by weight, particularly preferred 1 to 2.5% by weight, in relation to the total weight of the compound.

According to the invention, the compound contains as filler a spherical filler with an average grain size of between 20 and 500 µm, particularly preferred between 40 and 150 µm. In a particularly preferred manner, the spherical filler is a lightweight filler, such as hollow glass beads, foam glass beads, fly ash, ceramic hollow beads, glass beads, particularly solid glass beads (e.g., Ballotini® made by Sto AG) and/or sands.

In contrast to the fillers, lightweight fillers have a much lower specific weight. The usable lightweight fillers according to the invention have a specific weight of less than 1 kg/L, particularly less than 0.8 kg/L, and most particularly less than 0.6 kg/L.

According to the invention, the hard, powder-shaped ingredients—except for the physically acting propellant—have an average grain size below 10 µm, so that according to the invention, the spherical filler has an average grain size above 10 µm. Preferably, the average grain size of the spherical filler lies in a range of 20 to 500 µm, more preferably between 30 and 300 µm, and particularly preferred between 40 and 150 µm.

To achieve better workability, it is necessary that the spherical fillers are larger than the other solid ingredients contained in the composition, except for the physically acting propellant. In a completely unexpected manner, the size of the physically acting propellant has no influence on the workability of the composition, even at a high fiber content. According to the invention, the spherical filler thus has an average grain size, which is larger than the average grain size of the other fillers contained in the composition.

Besides better workability, usage of the spherical fillers, particularly the lightweight fillers, is also advantageous in some other points. By using them, the density can be reduced, shrinkage can be reduced to a minimum, and the costs of the composition can be decreased.

Surprisingly, the inventors have now discovered that specifically by combining physically acting propellants, ash crust stabilizer, particularly phosphorus-containing compounds, and inorganic fibers, a synergistic effect is achieved and the dispersing or falling out of the ash crust can be significantly reduced compared to other fireproofing additives and particularly compared to the individual substances. Without the present invention being bound to a theory or being limited by it, the inventors assume that the synergistic effect is based on the fact that the glass fibers become bonded by the phosphorus-containing compound, which vitrify at temperatures prevailing in the case of fire, and the expanded graphite particles are permanently integrated into the structure. Despite the simplified composition, very hard and stable ash crusts can hereby be formed.

If applicable, the fireproofing additives can also contain at least one ablatively acting additive. For practical purposes, those materials are used as ablatively acting additives which form energy-consuming layers by means of separating out water, which is stored in the form of crystal water for example, and evaporating water. The heat energy that must be used to separate out the water is thereby removed from the fire. Furthermore, those materials are used that chemically change or decompose, evaporate, sublimate, or melt in an endothermic reaction due to the effect of heat. The coated substrates are thereby cooled. Often, during composition, inert, i.e., non-combustible gases, such as carbon dioxide, are released, which further dilute the oxygen in the immediate vicinity of the coated substrate.

Suited as gas-separating ingredients are hydroxides, such as aluminum hydroxide and magnesium hydroxide as well as their hydrates, which separate out water, as well as carbonates, such as calcium carbonate, that separate out carbon dioxide. Basic carbonates are able to separate out both water as well as $CO_2$. Preferred is a combination of ingredients beginning the gas separation at various temperatures. For example, water separation already begins at approx. 200° for aluminum hydroxide, whereas water separation begins at approx. 350° for magnesium hydroxide, so that gas separation occurs over a larger temperature range.

Suitable ablatively acting materials are inorganic hydroxides or hydrates releasing water under the effect of heat, such as those of sodium, potassium, lithium, barium, calcium, magnesium, boron, aluminum, zinc, nickel, as well as boric acid and their partially dehydrated derivatives.

For example, one can mention the following compounds: $LiNO_3\text{-}3H_2O$, $Na2CO3H2O$ (thermonatrite), $Na_2CO_3.7H_2O$, $Na_2CO_3.10H_2O$ (soda), $Na_2Ca(CO_3)_2.2H_2O$ (pirssonite), $Na_2Ca(CO_3)_2.5H_2O$ (gaylussite), $Na(HCO_3)Na_2CO_3.2H_2O$ (trona), $Na_2S_2O_3\text{-}5H_2O$, $Na_2O_3Si.5H_2O$, $KF.2H_2O$, $CaBr_2.2H_2O$, $CaBr_2.6H_2O$, $CaSO_4.2H_2O$ (gypsum), $Ca(SO_4).\frac{1}{2}H_2O$ (bassanite), $Ba(OH)_2.8H_2O$, $Ni(NO_3)_2.6H_2O$, $Ni(NO_3)_2.4H_2O$, $Ni(NO_3)_2.2H_2O$, $Zn(NO_3)_2.4H_2O$, $Zn(NO_3)_2.6H_2O$, $(ZnO)_2(B_2O_3)_2.3H_2O$, $Mg(NO_3)_2.6H_2O$ (U.S. Pat. No. 5,985,013 A), $MgSO_4.7H_2O$ (EP1069172A), $Mg(OH)_2$, $Al(OH)_3$, $Al(OH)_3.3H_2O$, AlOOH (boehmite), $Al_2[SO_4]_3.nH_2O$ where n=14–18 (U.S. Pat. No. 4,462,831 B), if applicable in a mixture with $AlNH_4(SO_4)_2.12H_2O$ (U.S. Pat. No. 5,104,917A), $KAl(SO_4)_2.12H_2O$ (EP1069172A), $CaO.Al_2O_3$ $10H_2O$ (nesquehonite), $MgCO_3.3H_2O$ (wermlandite), $Ca_2Mg_{14}(Al,Fe)_4CO_3(OH)_{42}.29H_2O$ (thaumasite), $Ca_3Si(OH)_6(SO_4)(CO_3).12H_2O$ artinite), $Mg_2(OH)_2CO_3H_2O$ (ettringite), $3CaO.Al_2O_3.3CaSO_4.32H_2O$ (hydromagnesite), $Mg_5(OH)_2(CO_3)_4.4H_2O$ (hydrocalumite), $Ca_4Al_2(OH)_{14}.6H_2O$ (hydrotalcite), $Mg_6Al_2(OH)_{16}CO_3.4H_2O$ alumohydrocalcite, $CaAl_2(OH)_4(CO_3)_2.3H_2O$ scarbroite, $Al_{14}(CO_3)_3(OH)_{36}$ hydrogranate, $3CaO.Al_2O_3.6H_2O$ dawsonite, $NaAl(OH)CO_3$, aqueous zeolites, vermiculites, colemanite, perlite, mica, alkali silicates, borax, modified carbons and graphites, and silicic acids.

In a preferred embodiment, the hydrated salts are selected from the group consisting of $Al_2(SO_4).16\text{-}18H_2O$, $NH_4Fe(SO_4)_2.12H_2O$, $Na_2B_4O_7.10H_2O$, $NaAl(SO_4)_2.12H_2O$, $AlNH_4(SO_4)_2.12\text{-}24H_2O$, $Na_2SO_4.10H_2O$, $MgSO_4.7H_2O$, $(NH_4)_2SO_4.12H_2O$; $KAl(SO_4)_2.12H_2O$, $Na_2SiO_3.9H_2O$, $Mg(NO_2)_2.6H_2O$, $Na_2CO_3.7H_2O$ and mixtures thereof (EP1069172A).

Optionally, one or more reactive flame inhibitors can be added to the composition according to the invention. Such compounds are incorporated in the binding agent. An example within the sense of the invention are reactive organophosphorus compounds, such as 9,10-dihydro-9-oxa-10-phosphaphenanthrene-10-oxide (DOPO) and its derivatives and adducts. Such compounds are described for example in S. V. Levchik, E. D. Weil, Polym. Int. 2004, 53, 1901-1929.

If applicable, the compounds according to the invention may contain other conventional additives, such as softeners, fillers, pigments, additives to adjust the rheological properties, thickening agents, dispersing agents, emulgators, biocides, fungicides, preservatives and anti-oxidants, antifreeze agents, wetting agents, anti-foaming agents and/or skin formation retarding agents. These other additives are commercially available products known to persons skilled in the art in the field of sealing masses for construction purposes in particular.

As fillers, one can use the fillers conventionally used in sealing masses and known to persons skilled in the art as long as they do not enter into a reaction with acids. As fillers, one can mention for example: chalk, barium sulfate, quartz, talcum, kaolin, calcium sulfate and/or calcium silicate. The filler may be used alone or as a mixture of two or more.

The following table depicts the ingredients and their quantities of the comparison compositions and the compositions according to the invention. Furthermore, the table depicts the rating regarding workability of the respective compound and the rating regarding crust stability, i.e., the rigidity of the formed ash crust.

As one can see, the compositions according to the invention (Examples 1-3) are more easily worked and produce relatively hard ash crusts despite the simplified composition of the ash crust stabilizers, compared to the comparison compositions (comparison examples 1-4).

|  | Comparison example 1 | Comparison example 2 | Comparison example 3 | Comparison example 4 | Example 1 | Example 2 | Example 3 |
|---|---|---|---|---|---|---|---|
| Acrylate dispersion | 39.00% | 39.00% | 39.00% | 39.00% | 39.00% | 39.00% | 39.00% |
| Ammonia 25% | 0.70% | 0.70% | 0.70% | 0.70% | 0.70% | 0.70% | 0.70% |
| Isotridecanol ethoxylate | 0.20% | 0.20% | 0.20% | 0.20% | 0.20% | 0.20% | 0.20% |
| Ammonium acrylate | 0.50% | 0.50% | 0.50% | 0.50% | 0.50% | 0.50% | 0.50% |
| Hydroxyethyl cellulose | 0.40% | 0.40% | 0.20% | 0.20% | 0.20% | 0.20% | 0.20% |
| Water | 4.00% | 4.00% | 5.40% | 5.40% | 5.40% | 5.40% | 5.40% |
| Kaolin |  |  |  |  |  |  | 24.80% |
| Chalk | 25.10% | 37.10% | 34.80% | 32.80% | 22.80% | 24.8% |  |
| Foam glass beads |  |  |  |  | 10.00% | 10.00% | 10.00% |
| Glass fibers | 1.10% | 1.10% | 2.20% | 2.20% | 2.20% | 2.20% | 2.20% |
| Ammonium polyphosphate | 10.00% | 10.00% | 10.00% |  |  | 10.00% | 10.00% |
| Zinc borate | 12.00% |  |  | 12.00% | 12.00% |  |  |
| Expandable graphite | 6.00% | 6.00% | 6.00% | 6.00% | 6.00% | 6.00% | 6.00% |
| Iron oxide | 1.00% | 1.00% | 1.00% | 1.00% | 1.00% | 1.00% | 1.00% |
|  | 100.00% | 100.00% | 100.00% | 100.00% | 100.00% | 100.00% | 100.00% |
| Workability | Good | Good | Very poor | Very poor | Very good | Very good | Very good |
| Crust stability | 5 | 2 | 6 | 4 | 4 | 6 | 5 |

The composition may preferably contain as pigments iron oxide, titanium dioxide, zinc sulfide, zinc oxide and/or organic or inorganic color pigments.

To adjust the rheological properties, the composition according to the invention may contain as additives highly dispersed silicic acid, bentonite, or modified bentonite, polyacrylates and/or cellulose derivatives, such as cellulose ether, for example.

The additives may be contained in a quantity of approx. 0.05 to 2.5% by weight, preferably 0.1 to 1% by weight, particularly preferably 0.1 to 0.5% by weight, in relation to the total weight of the composition.

The following examples serve to further explain the invention.

EMBODIMENTS

To evaluate the ash crust stability, slabs having a thickness of about 5 mm are made from the masses and then hardened for 2 weeks at room temperature and another 2 weeks at 50° C. From these slabs, disks having a diameter of 50 mm are punched out. These disks are reduced to ashes on a metal plate at 600'C for 30 min. Then, the formed ash bodies are compressed with a spatula and the rigidity is rated, whereby the rating occurs using a scale of 1 to 6. A rating with a value of 1 means a very low ash crust stability and a rating with a value of 6 means a very high ash crust stability.

Workability is represented by the smoothability, in other words how easily a smooth, visually appealing surface can be produced. Impeding factors are thereby the formation of strings and wrinkles.

The invention claimed is:

1. A composition, comprising:
a binding agent based on an aqueous or solvent-based organic polymer dispersion;
wherein the binding agent only includes one or more of the organic polymer dispersions,
a fireproofing additive, which comprises
a physically acting propellant; and
an ash crust stabilizer,
0.5 to 3.5% by wt. based on a total weight of said composition, of inorganic fibers having a length of between 2 to 12 mm;
and
a spherical filler,
wherein the spherical filler has an average grain size that is larger than the average grain size of the other solids contained in the composition, except for the physically acting propellant.

2. The composition according to claim 1, wherein the ash crust stabilizer is zinc borate or a phosphorus-containing compound selected from the group consisting of salts of oxoacids of phosphor and esters of oxoacids of phosphor.

3. The composition according to claim 1, wherein a particle size of said spherical filler is >20 μm.

4. The composition according to claim 3, wherein a particle size of said spherical filler is between 40 and 500 μm.

5. The composition according to claim 1, wherein said spherical filler is a lightweight filler with a specific weight of less than 1 kg/L.

6. The composition according to claim 1, wherein said physically acting propellant is at least one selected from the group consisting of a graphite-intercalation compound, a sheet silicate-intercalation compound and vermiculite.

7. The composition according to claim 1, wherein said physically acting propellant is a graphite-intercalation compound.

8. The composition according to claim 1, wherein said ash crust stabilizer is at least one oxoacid of a phosphor selected from the group consisting of orthophosphoric acid, pyrophosphoric acid, triphosphoric acid and polyphosphoric acid.

9. The composition according to claim 1, wherein said ash crust stabilizer is at least one phosphorus-containing compound selected from the group consisting of monoammonium phosphate, diammonium phosphate, ammonium phosphate, melamine resin phosphates, potassium phosphate, melamine phosphate, ammonium polyphosphate and melamine polyphosphates.

10. The composition according to claim 1, wherein said binding agent based on an aqueous or solvent-based polymer dispersion comprises an acrylate-(copolymer)-dispersion.

11. The composition according to claim 1, further comprising other additives and/or fillers.

12. The composition according to claim 1, comprising 0.5 to 3% by wt. of inorganic fibers having a length of between 2 to 12 mm.

13. The composition according to claim 1, wherein the inorganic fibers consist of inorganic fibers having a length of between 2 to 12 mm.

14. The composition according to claim 2, wherein said binding agent based on an aqueous or solvent-based polymer dispersion comprises an acrylate-(copolymer)-dispersion.

15. The composition according to claim 14, wherein the physically acting propellant is at least one selected from the group consisting of a graphite-intercalation compound, a sheet silicate-intercalation compound and vermiculite, and is contained in about 4 to 15% by weight based on the total weight of the composition.

16. The composition according to claim 15, wherein the ash crust stabilizer is a phosphorus-containing compound selected from the group consisting of salts of oxoacids of phosphor and esters of oxoacids of phosphor and is contained in about 5 to 15% by weight based on the total weight of the composition.

17. The composition according to claim 1, wherein the polymer dispersion comprises an aqueous acrylate dispersion, aqueous dispersion or emulsion of urea, formaldehyde or melamine, polyvinyl acetates, polyvinyl alcohols, acrylate nitrile, styrene acrylates, or their copolymers.

18. The composition according to claim 16, wherein the inorganic fibers are glass fibers, silicate fibers, or mineral wool fibers.

19. The composition according to claim 18, wherein the spherical filler is hollow glass beads, foam glass beads, fly ash, ceramic hollow beads, or solid glass beads.

20. The composition according to claim 18, wherein the spherical filler is foam glass beads and the inorganic fibers are glass fibers.

* * * * *

UNITED STATES PATENT AND TRADEMARK OFFICE
CERTIFICATE OF CORRECTION

Page 1 of 1

PATENT NO. : 11,174,434 B2
APPLICATION NO. : 16/400091
DATED : November 16, 2021
INVENTOR(S) : Herbert Muenzenberger et al.

It is certified that error appears in the above-identified patent and that said Letters Patent is hereby corrected as shown below:

On the Title Page

In Column 2, under the Foreign Patent Documents section:

Line 2 reads:
"DE 102 59 084 A1 7/2003"
And should be:
-- DE 102 59 085 A1 7/2003 --, and Line 7 reads:
"PA 1 489 136 A1 12/2004"
And should be:
-- EP 1 489 136 A1 12/2004 --.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*